US012571875B2

(12) United States Patent
Radic

(10) Patent No.: US 12,571,875 B2
(45) Date of Patent: Mar. 10, 2026

(54) RANGE EXTENSION OF RADIO FREQUENCY IDENTIFICATION DEVICES

(71) Applicant: Peter Radic, San Diego, CA (US)

(72) Inventor: Peter Radic, San Diego, CA (US)

(*) Notice: Subject to any disclaimer, the term of this patent is extended or adjusted under 35 U.S.C. 154(b) by 356 days.

(21) Appl. No.: 18/370,327

(22) Filed: Sep. 19, 2023

(65) Prior Publication Data

US 2024/0103120 A1     Mar. 28, 2024

Related U.S. Application Data

(60) Provisional application No. 63/409,325, filed on Sep. 23, 2022.

(51) Int. Cl.
*G01S 5/04*          (2006.01)
*G01S 13/87*         (2006.01)
(52) U.S. Cl.
CPC .............. *G01S 5/04* (2013.01); *G01S 13/878* (2013.01)
(58) Field of Classification Search
CPC ... G01S 5/06; G01S 1/026; G01S 3/02; G01S 5/02213; G01S 5/0249; G01S 5/0284; G01S 5/021; G01S 5/0246; G01S 5/0218; G01S 5/0242; H04W 64/00; H04W 64/006; H04W 4/027; H04W 4/023
See application file for complete search history.

(56) References Cited

U.S. PATENT DOCUMENTS

| | | | | |
|---|---|---|---|---|
| 7,489,937 | B2* | 2/2009 | Chung | G01S 5/06 |
| | | | | 342/84 |
| 2011/0074631 | A1* | 3/2011 | Parker | G01S 5/16 |
| | | | | 342/378 |
| 2017/0003376 | A1* | 1/2017 | Wellman | H04K 3/822 |
| 2020/0386851 | A1* | 12/2020 | Eakins | G01S 11/10 |

OTHER PUBLICATIONS

S. Agrawal, P. Kumar and A. Sharma, "Passive Emitter Localisation Using TDOA and FDOA Measurements from UAV," 2020 IEEE International Conference for Innovation in Technology (INOCON), Bangluru, India, 2020, pp. 1-5, doi: 10.1109/INOCON50539.2020. 9298328. (Year: 2020).*

* cited by examiner

*Primary Examiner* — Olumide Ajibade Akonai
(74) *Attorney, Agent, or Firm* — Kilpatrick Townsend & Stockton LLP

(57)          ABSTRACT

Embodiments of the present disclosure utilize signals generated by a radio frequency identification (RFID) antenna to locate the antenna. For example, a signal emitted by a transmitter can cause an unpowered mobile device's RFID antenna to generate return signals that are received by multiple antennas. Time difference of arrival (TDOA) and a frequency difference of arrival (FDOA) values can be calculated for the received signals. The calculated TDOA and FDOA values can be correlated using a cross ambiguity function (CAF). The correlated values can be plotted on a map to create a set of correlation maps. The correlation maps can be combined to produce an average map and the antenna can be located by identifying a maximum correlation value on the average map.

20 Claims, 10 Drawing Sheets

1000

Divide the search area into a grid of points 1010

Calculate projected TDOA and FDOA values for at least a subset of the points of the grid of points 1020

Generate a set of correlation maps by, for each map: emitting a signal from a transponder 1030

Receive a first return signal at a first antenna and a second return signal at a second antenna, the return signals generated by a RFID antenna 1040

Determine at least one of an observed TDOA or an observed FDOA for the received signals 1050

Determine a set of correlation values using at least one of the observed TDOA or FDOA 1060

Generate the correlation map by plotting the set of correlation values onto the search area 1070

Average the set of correlation maps to produce an average map 1080

Locating the RFID antenna using the average map 1090

1000

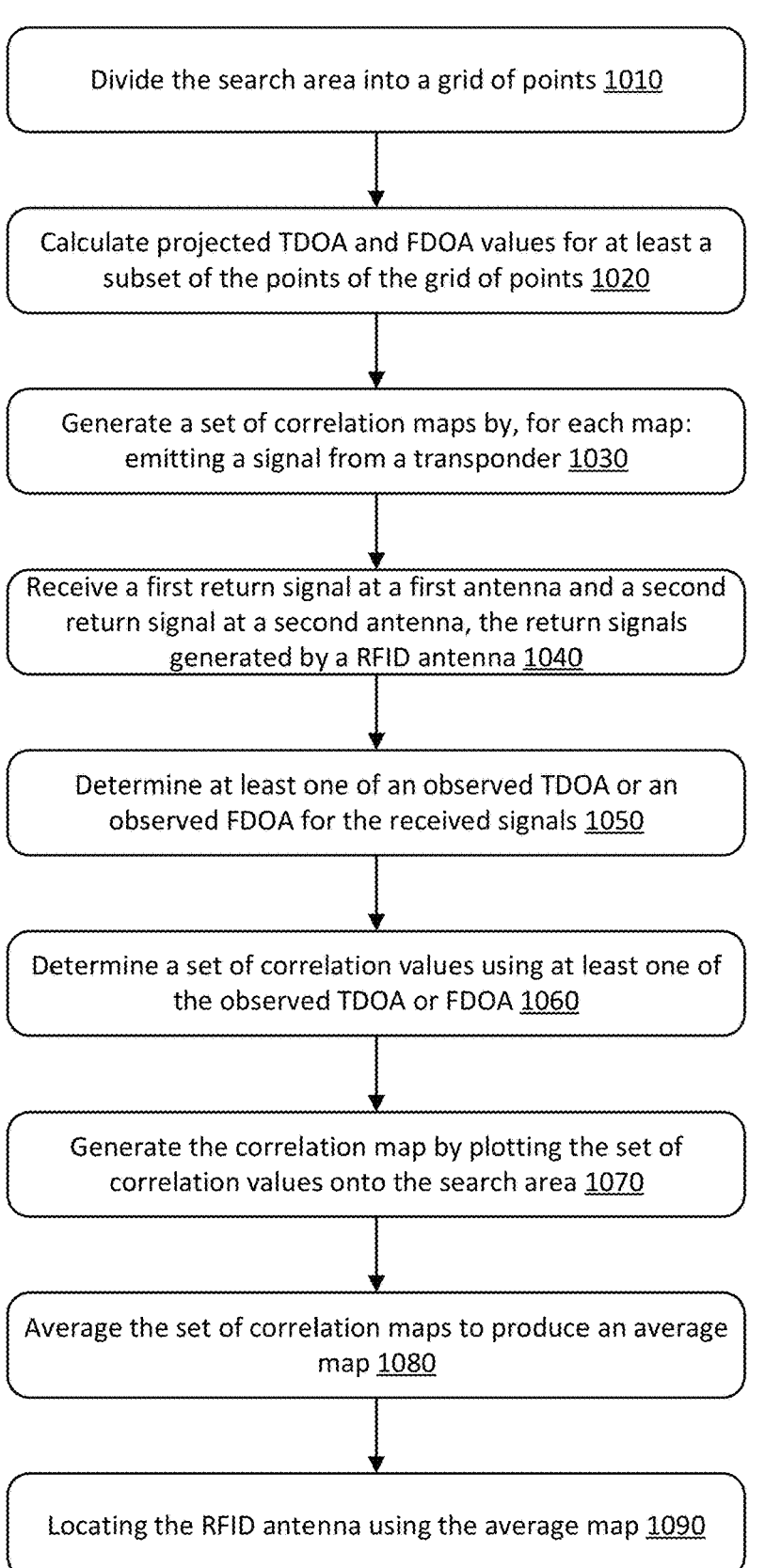

Divide the search area into a grid of points 1010

Calculate projected TDOA and FDOA values for at least a subset of the points of the grid of points 1020

Generate a set of correlation maps by, for each map: emitting a signal from a transponder 1030

Receive a first return signal at a first antenna and a second return signal at a second antenna, the return signals generated by a RFID antenna 1040

Determine at least one of an observed TDOA or an observed FDOA for the received signals 1050

Determine a set of correlation values using at least one of the observed TDOA or FDOA 1060

Generate the correlation map by plotting the set of correlation values onto the search area 1070

Average the set of correlation maps to produce an average map 1080

Locating the RFID antenna using the average map 1090

RANGE EXTENSION OF RADIO FREQUENCY IDENTIFICATION DEVICES

CROSS-REFERENCE TO RELATED APPLICATION

This application claims the benefit of and priority to U.S. Provisional Application No. 63/409,325, filed Sep. 23, 2022, which is hereby incorporated by reference in its entirety for all purposes.

BACKGROUND

Techniques for using correlative receivers for device localization have been developed. These techniques have been used to locate both powered and passive emitters. However, powered emitters that actively generate signals may not be feasible in all situations including search and rescue operations, and particularly when power is lost; passive emitters might not have sufficient range in all cases. Accordingly, there is a need in the art for improved methods and systems related to using correlative receivers for device localization that is applicable to both active and passive emitters located at an unknown location.

SUMMARY

Provided are techniques, including computer-implemented methods, apparatuses, and computer-program products for device localization.

Embodiments of the present disclosure utilize signals generated by a radio frequency identification (RFID) antenna to locate the antenna. For example, a signal emitted by a transmitter can cause an unpowered mobile device's RFID antenna to generate return signals that are received by multiple antennas. Time difference of arrival (TDOA) and frequency difference of arrival (FDOA) values can be calculated for the received signals. The calculated TDOA and FDOA values can be correlated using a cross-ambiguity function (CAF). The correlated values can be plotted on a map to create a set of correlation maps. The correlation maps can be combined to produce an average map and the antenna can be located by identifying a maximum correlation value on the average map.

According to an embodiment of the present disclosure, a technique for locating an RFID antenna also referred to as device localization, is provided. The technique includes dividing a search area into a grid of points. Projected TDOA and FDOA values can be calculated for at least a subset of the points of the grid of points. A set of correlation maps can be generated to locate the RFID antenna. A signal can be emitted from a transmitter for each map of the set of maps. The location of the transmitter can vary between each correlation map. A first return signal can be received at a first antenna and a second return signal can be received at a second antenna. The return signals can be generated by an RFID antenna. At least one of a set of observed TDOA values or a set of observed FDOA values can be determined for the first return signal and the second return signal. A set of correlation values can be determined by providing at least one of the set of observed TDOA values or the set of observed FDOA values as input to a CAF generator. The correlation map can be generated by plotting the set of correlation values onto the search area by assigning a correlation value to a point on the grid. The assigned correlation value can correspond to a pair comprising at least one of an observed TDOA value or an observed FDOA value that was used to generate the correlation value. The point on the grid can correspond to at least one of a projected TDOA or a projected FDOA values that are within a threshold distance of the pair. The set of correlation maps can be averaged to produce a final map, and the RFID antenna can be located on the final map by identifying a maximum correlation value.

According to another embodiment of the present disclosure, a technique for locating an RFID antenna also referred to as device localization, is provided. The technique includes dividing a search area into a grid of points. Projected TDOA and FDOA values can be calculated for at least a subset of the points of the grid of points. A set of correlation maps can be generated to locate the RFID antenna. A signal can be emitted from a transmitter for each map of the set of maps. The location of the transmitter can vary between each correlation map. A first return signal can be received at a first antenna and a second return signal can be received at a second antenna. The return signals can be generated by an RFID antenna. A set of observed TDOA values and a set of observed FDOA values can be determined for the first return signal and the second return signal. A set of correlation values can be determined by providing the set of observed TDOA values and the set of observed FDOA values as input to a CAF generator. The correlation map can be generated by plotting the set of correlation values onto the search area by assigning a correlation value to a point on the grid. The assigned correlation value can correspond to a pair comprising an observed TDOA value and an observed FDOA value that was used to generate the correlation value. The point on the grid can correspond to a projected TDOA and a projected FDOA values that are within a threshold distance of the pair. The set of correlation maps can be averaged to produce a final map, and the RFID antenna can be located on the final map by identifying a maximum correlation value.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present disclosure are described in detail below with reference to the following figures.

FIG. 10 is a flowchart of a method for performing device localization in accordance with at least one embodiment of the present disclosure.

DETAILED DESCRIPTION

Figure 1:
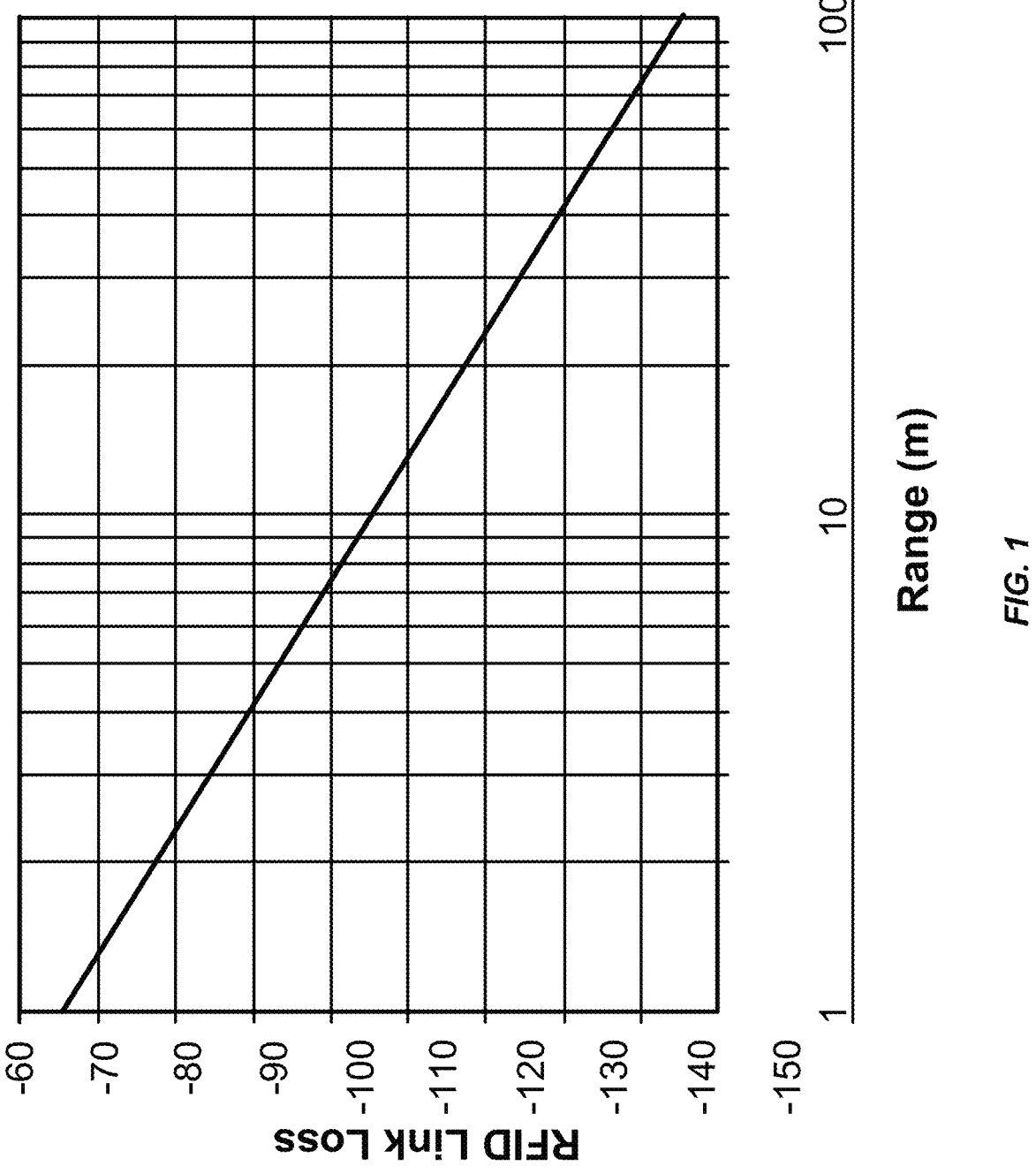
FIG. 1 shows a graph depicting the change in radiofrequency identification (RFID) link loss by range according to at least one embodiment.

The present disclosure relates generally to methods and systems related to device localization. More particularly, embodiments of the present disclosure provide methods and systems for utilizing received signals to locate a radio frequency identification (RFID) antenna. Embodiments of the present disclosure are applicable to a variety of applications including mobile device location in search and rescue operations.

Radio Frequency Identification (RFID) devices are now a ubiquitous part of commercial systems that serve transportation, supply chain management, toll collection, animal tracking, asset management and security applications. RFID devices can be used to identify individuals or objects. These devices rely on a common principle: RFID devices provide an electromagnetic (EM) signature read by the querying transmitter.

RFID links can be categorized by the operating range, which can vary from centimeters to tens of meters. Near-proximity systems rely on close-coupling of EM field and typically operate at frequencies below 30 megahertz (MHz). In near proximity systems, the link between the reader (querying terminal) and the transponder (RFID device tagging the asset) relies on reader-transponder proximity to transfer data between the two devices.

Remote coupled systems are designed to transfer modulated EM signatures over a specified range. Short-range systems can employ an inductively coupled reader-transponder link and these systems can resemble EM link established in an ordinary electric transformer. While there may not be a ferrite core to aid EM coupling, these links can be distinct from the ordinary radiofrequency (RF) transmission where propagation effects are taken into the account. Consequently, short-range systems are used in systems that operate below 1 meter (m) range.

Long-range RFID (LR-RFID) can include RFID systems that operating beyond 1 m range. These long-range systems resemble conventional RF links as they incorporate antennas, direct-antenna modulation, and spectral band allocations. LR-RFID can be subdivided into passive and active systems. LR-RFID links can operate in either ultra-high frequency (UHF; 868-915 MHz) or microwave band (2.5 GHz and 5.8 GHz). An active RFID transponder can contain a power supply that is remotely triggered by a signal received from a RFID reader. Once triggered, the power supply and the received signal can drive on-board circuity that generates the RFID return signal. Passive RFID transponders use the received signal to generate the RFID return signal without an additional power source.

In practice, both active and passive LR-RFID systems may only use EM energy from the signal received at the system's antenna to generate the return signal. Such systems may not provide additional energy to the return signal sent to the reader. However, the power supply in an active LR-RFID system may be used to modulate the received signal to produce the return signal. As a consequence, both active and passive LR-RFID transponders can be limited to the EM energy level in the signal received from the RFID reader.

A reliance on received signal energy can limit the operational range of both active and passive LR-RFID transponders. In practice, typical ranges are between 3 m and 15 m with few advanced systems capable of ranges of 10 m or more. Consequently, the conventional use of LR-RFID tags in rescue and recovery of RFID tagged people or assets may not be viable. Even in most localized operations (such as earthquakes), desired localization ranges exceed hundreds of meters. In less localized events (such as hurricanes), the practical range necessary for rescue can exceed one kilometer.

The practical range of conventional LR-RFID system can be estimated by the following formula provided in equation (1):

$$\frac{P_{Block}}{P_{Read}} = \eta G_{Read}^2 G_{Back}^2 \frac{c^4}{(4\pi r f_0)^4} \tag{1}$$

where $P_{Read}$ is the reader transmitted signal power, $P_{Back}$ is the return signal RF power, $\eta$ is matching between the antenna and input impedance, $G_{Read}$ and $G_{Read}$ are antenna gain, r is the distance between the reader and the RFID transponder and $f_0$ is operating RF frequency.

FIG. 1 shows a graph depicting the change RFID link loss by range according to at least one embodiment. RFID link loss is shown in decibels (dB) on the y-axis and distance is shown in m on the x-axis. In case of typical coupling (0.4-0.5) and gain (G~1), the RFID link loss is large even at short range: reader-transponder loss approaches 100 dB at 10 m range and at 100 m it exceeds 140 dB.

The RFID link loss graph depicted in FIG. 1 illustrates the challenge of extending the range of LR-RFID system: to overcome the link loss at long ranges, it is either necessary to design and construct a sensitive receiver or to amplify the received signal from the transponder. The latter may not be practical for search and rescue applications since amplifying the received signal from the transponder may mean increasing the power supply at the remote RFID transponder node. In search and rescue situations, the RFID transponder node may be out of power. In addition, a searcher attempting to locate the RFID transponder may have no control over the transponder's design. For example, a searcher may be attempting to locate RFID tags in mobile devices that were not designed for search and rescue. A more viable option may be to increase receiver sensitivity at the RFID reader to extend viable range for RFID location and recognition.

Figure 2:
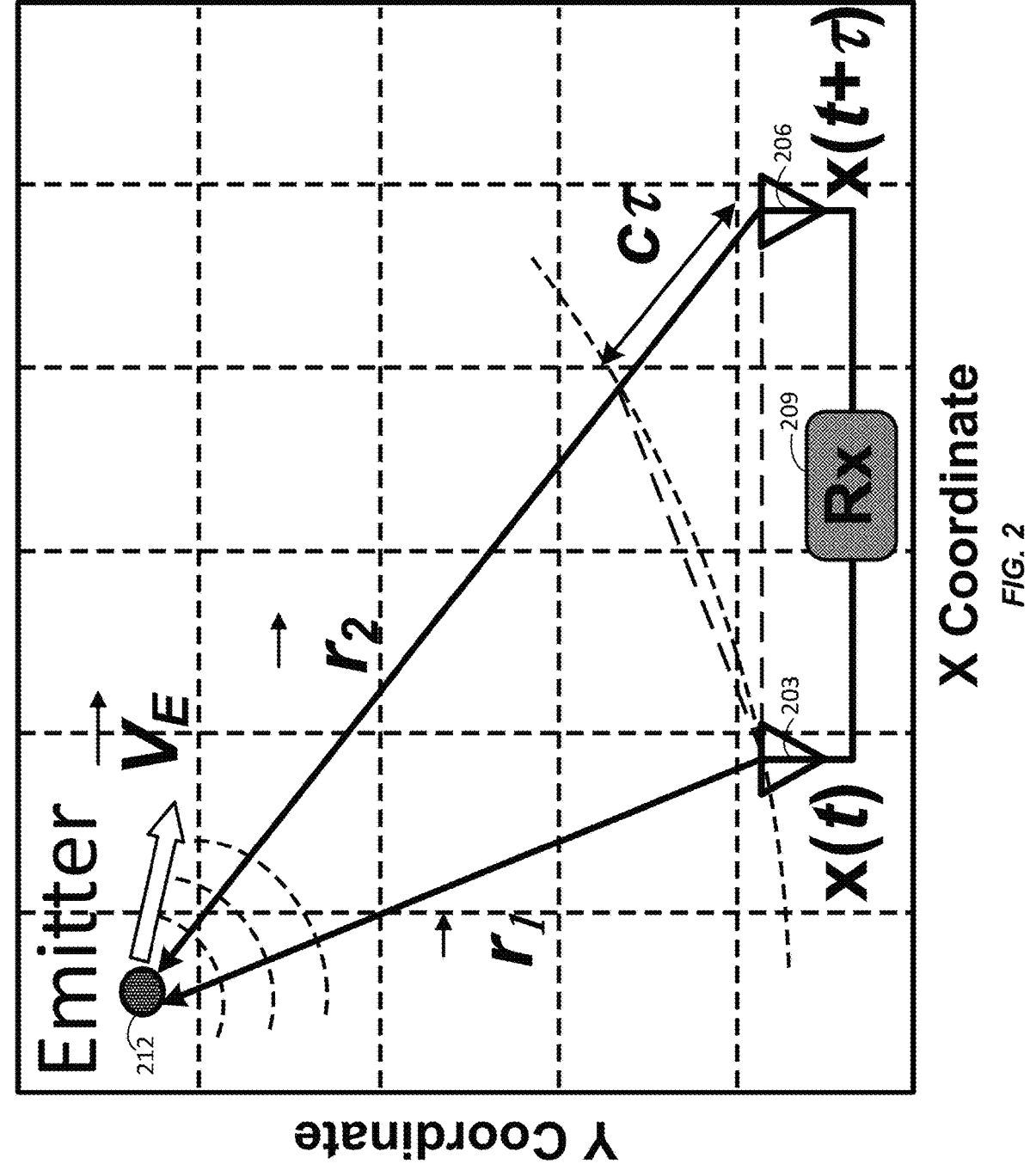
FIG. 2 shows a coordinate plane with an emitter and a correlative receiver according to at least one embodiment.

FIG. 2 shows a coordinate plane with an emitter and a correlative receiver according to at least one embodiment. The RFID reader's receiver sensitivity can be substantially increased when the RFID transponder location is prioritized over the transponder's data payload. A correlative receiver can be comprised of two or more spatially separated antennas, for example, first antenna 203 and second antenna 206, that feed the receiver's signal processing unit 209. An emission from the emitter 212 is captured by first antenna 203 and second antenna 206, which output a return signal and its delayed copy, respectively. The receiver's signal processing unit 209 can perform computational correlation on two inputs using the following cross-correlation function of equation (2):

$$R_x^\alpha(\tau) = \int_{-T/2}^{T/2} x(t)x(t-\underline{-\tau})e^{-j2\pi\alpha t}dt \tag{2}$$

where $\tau$ indicates the lag between two antennas, T is the integration time and a is cyclical frequency used to capture Doppler velocimetry (if any) from the emitter. A high sensitivity correlative receiver can have long integration time and can sweep different frequencies of interest that an unknown emitter can occupy.

Figure 3:
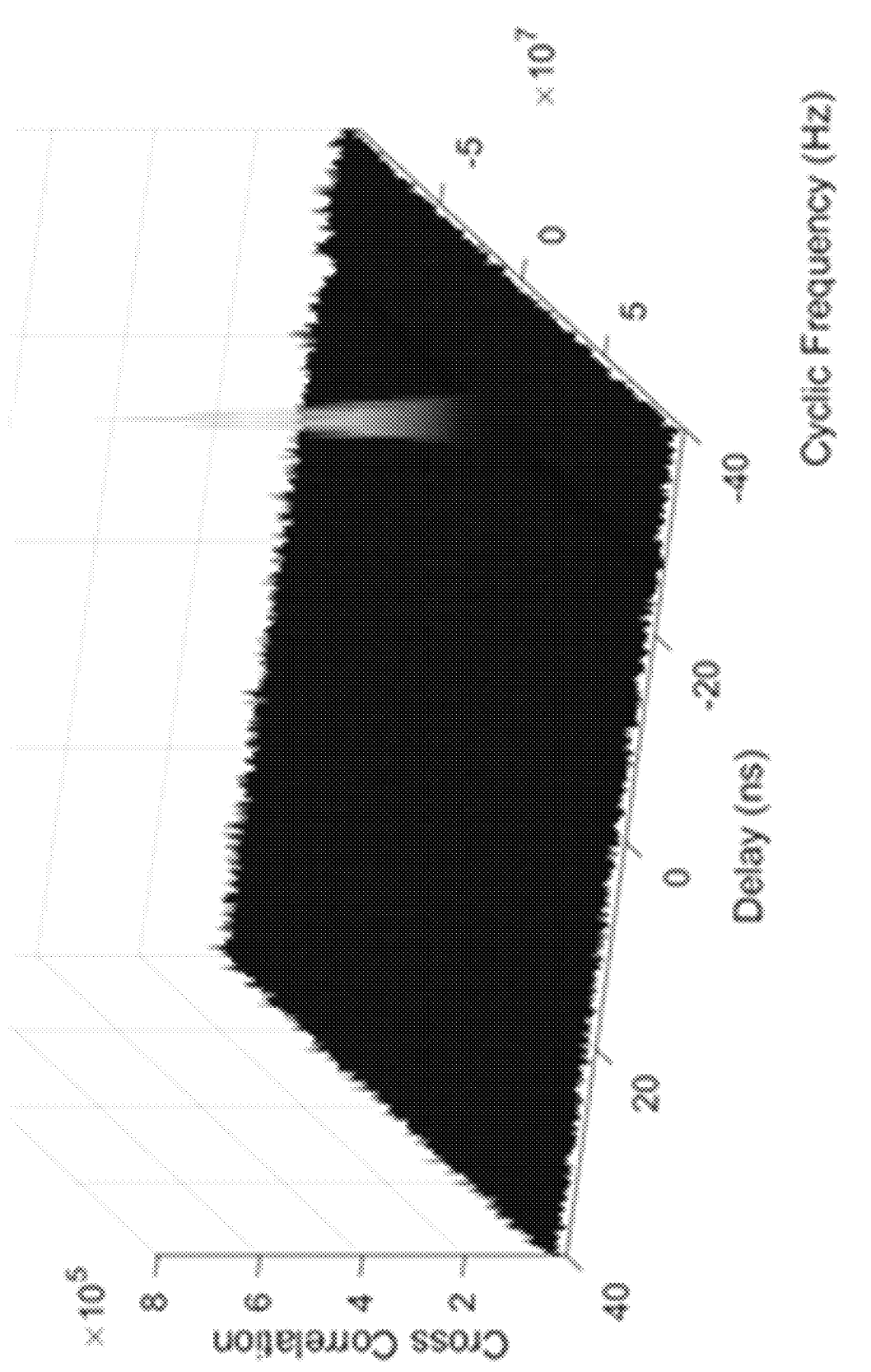
FIG. 3 shows a TDOA-FDOA map of a cross-correlation between the time difference of arrival (TDOA) and a frequency difference of arrival (FDOA) for received signals according to at least one embodiment.

FIG. 3 shows a TDOA-FDOA map of a cross correlation between the time difference of arrival (TDOA) and a frequency difference of arrival (FDOA) for received signals according to at least one embodiment. Generation of a cross correlation function can be used to establish the emitter's location and its velocimetry. Geolocation with a correlative receiver is computed using the cross-correlation of the emitted signal's time-difference-of-arrival (TDOA) and frequency-difference-of-arrival (FDOA). FIG. 3 shows the results of the cross-correlation function generated by the receiver equipped with two antennas separated by 8 m. The x-axis in FIG. 3 shows the TDOA in nanoseconds (ns), the y-axis shows the FDOA in cyclic frequency in Hertz (Hz) and the z-axis is the magnitude of the cross correlation between the TDOA and the FDOA.

In the example depicted in FIG. 3, the receiver computation indicates TDOA of approximately 28 ns and negligible FDOA, as expected when both emitter and the receiver stationary (or moving slowly) with respect to each other. The extracted TDOA can be used to calculate the direction with respect to the antenna baseline (line connecting the two antennas feeding the receiver). More importantly, if the receiver is moved and used to generate additional TDOA information, the additional TDOA-FDOA map can be averaged with previously computed TDOA-FDOA maps to create an average TDOA-FDOA map. Combined output can be overlayed against a precomputed TDOA table of surrounding physical space to produce a cross correlation map. In some embodiments, multiple cross correlation maps can be averaged to generate an average cross correlation map.

To generate the precomputed TDOA table for the physical map surrounding the receiver, TDOA can be calculated in a Cartesian coordinate frame using equation (3):

$$\text{TDOA}=(|\vec{r}_1|-|\vec{r}_2|)/c \tag{3}$$

where the distances between antennas and an unknown emitter position are denoted as $r_1$-$r_2$ and c is the speed of an electromagnetic wave (i.e., the speed of light). For each distinct position of the receiver, the precomputed TDOA table is used to find the closest value to the TDOA output from cross-correlation function. If the location of the emitter remains ambiguous, the position of the receiver is changed and the cross-correlation function is updated and added to the previously computed values in order to increase the accuracy of the emitter location.

Figures 4A, 4B, 4C, 4D:
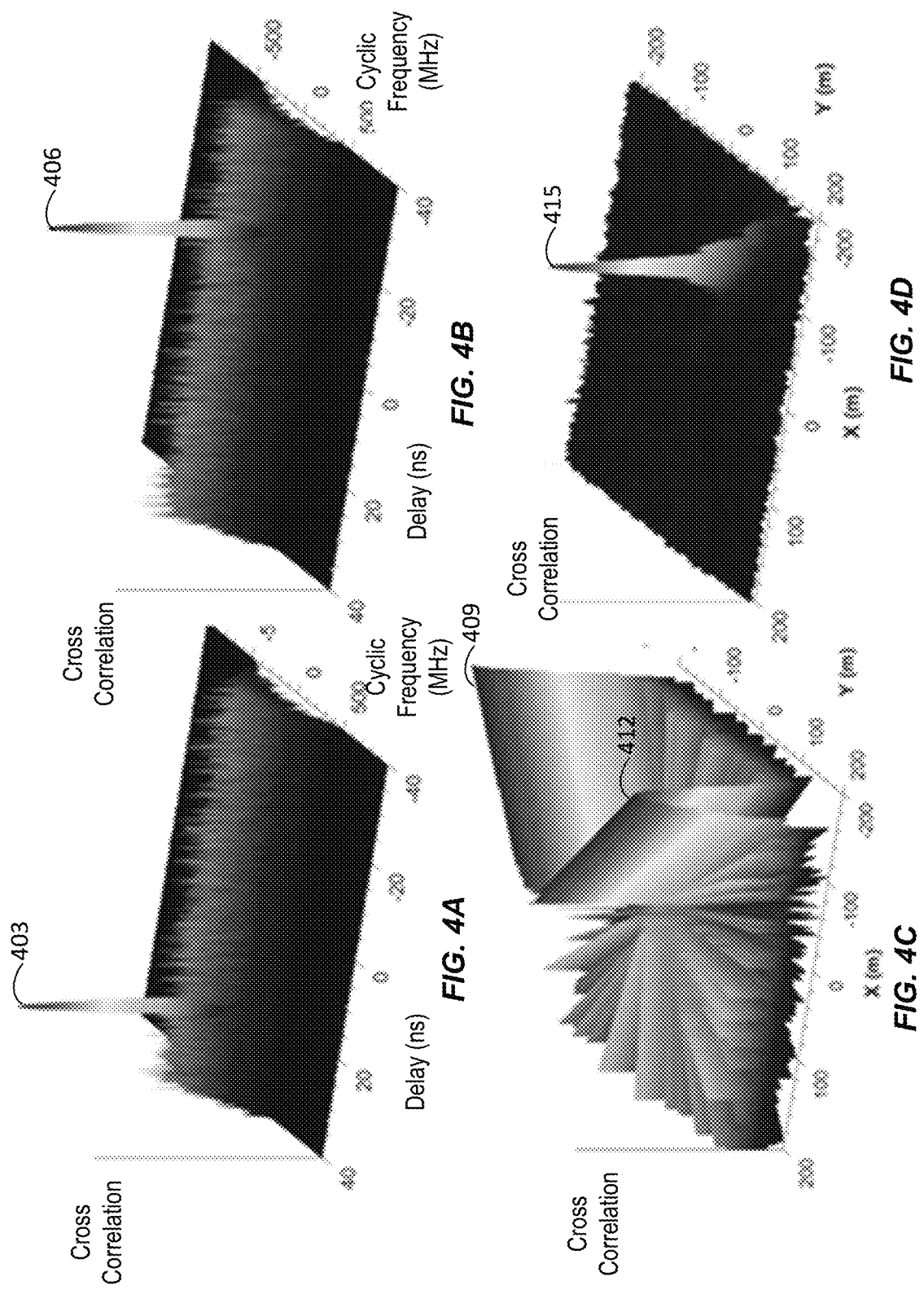
FIGS. 4A-4B show two separate TDOA-FDOA maps according to at least one embodiment.
FIGS. 4C-4D show two separate cross-correlation maps according to at least one embodiment.

FIGS. 4A-4B show two separate TDOA-FDOA maps according to at least one embodiment. FIG. 4A shows a TDOA-FDOA map calculated at the beginning of localization and FIG. 4B shows a TDOA-FDOA map that was calculated at the end of localization. In both 4A and 4B, the x axis is the delay in nanoseconds, the y axis is the cyclic frequency in mega Hertz (MHz), and the z axis is the magnitude of the cross correlation. The peak 403 with the highest cross correlation magnitude in FIG. 4A has a TDOA value of approximately 20 ns and an FDOA value of approximately 0 Hz. The peak 406 highest cross correlation magnitude in FIG. 4B has a TDOA value of approximately −20 ns and a FDOA value of approximately 0 Hz. The difference between the TDOA values in FIGS. 4A-4B is because the correlative receiver was moved during localization.

FIGS. 4C-4D show two separate cross correlation maps according to at least one embodiment. The x,y-axis for FIGS. 4C-4D form a coordinate plane and the z-axis is the magnitude of the calculated correlation from equation (2). Projected TDOA or FDOA values can be calculated for points on the x,y-coordinate plane in FIGS. 4C-4D. The maps depicted in FIGS. 4C-4D are generated by plotting the correlation magnitudes from TDOA-FDOA maps onto the x,y-coordinate plane. The magnitudes can be plotted using the precomputed TDOA or FDOA values. For instance, peak 403 can be plotted to a location on the x,y-coordinate plane with precalculated TDOA and FDOA values that correspond to 20 ns and 0 Hz. Similarly, peak 406 can be plotted to a location on the x,y-coordinate plane with precalculated TDOA and FDOA values that correspond to −20 ns and 0 Hz.

FIG. 4C shows a cross correlation map created at the beginning of localization using the TDOA-FDOA map from FIG. 4A. Uncertainty from the small sample size at the beginning of localization means FIG. 4C does not show a location for the emitter and instead depicts two possible directions for the emitter relative to the correlative receiver. The possible directions are shown as elongated peak 409 and elongated peak 412. FIG. 4D shows an average cross correlation map made at the end of localization. The map depicted in FIG. 4D is made by averaging the values from multiple TDOA-FDOA maps (e.g., the maps depicted in FIGS. 4A-4B plus any additional maps made during localization). The average values can reduce the influence of noise and the emitter can be located at correlation magnitude peak 415. It is worth noting that a portion of elongated peak 412 overlaps with correlation magnitude peak 415. Although some embodiments described herein utilize both TDOA and FDOA maps, other embodiments can utilize multiple TDOA maps computed with the receivers located at different locations.

Figure 5:
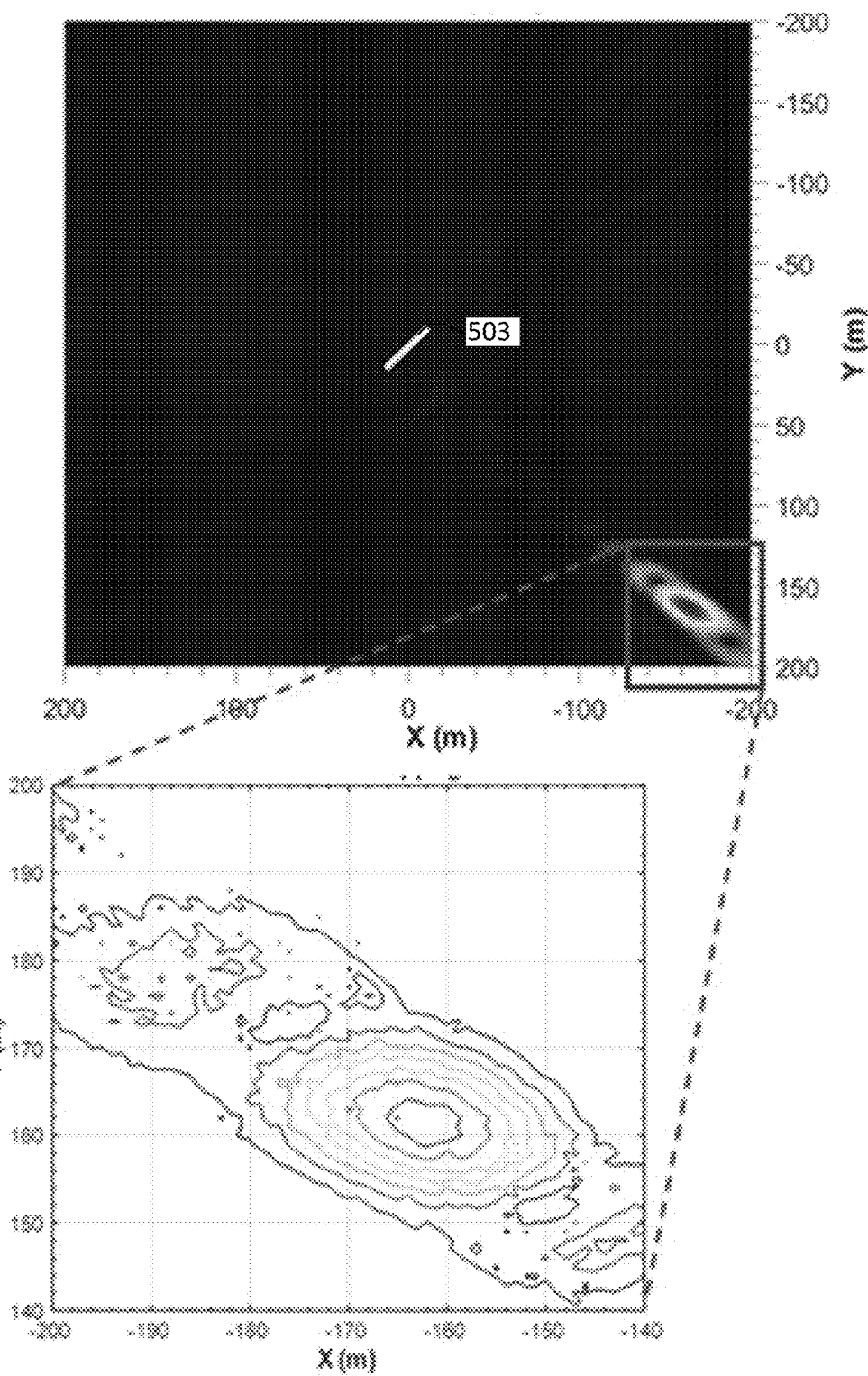
FIG. 5 is an intensity plot of a coordinate plane depicting the relative locations of the correlative receiver and the emitter according to at least one embodiment.

FIG. 5 is an intensity plot of a coordinate plane depicting the relative locations of the correlative receiver and the emitter according to at least one embodiment. FIG. 5 shows the x,y-coordinate plane that is illustrated in FIG. 4D. The inset in FIG. 5 shows a topographical map of the magnitude of the calculated correlation for a zoomed-in portion of the coordinate plane, highlighting the increase in the magnitude of the calculated correlation at correlation magnitude peak 415 illustrated in FIG. 4D. Line 503 shows a 40 m path taken by the receiver during the localization process. In this instance, the receiver moved in a straight line but other patterns of movement (e.g., circle, arc, polygon, etc.) are included within the scope of the present invention. The receiver made 20 measurements during the localization process and was able to locate the emitter's position to within a few meters over a 300 m distance.

The techniques described herein can be used to locate an unpowered RFID transponder during search and rescue. Even if the device that needs to be located is an active emitter (such as cellular phone), it is not realistic to expect that its power supply will last long enough for the search and rescue to rely on its active emissions. However, nearly all communication and telemetry devices are equipped with an RFID transponder, eliminating the need for a long-lived on-board power supply during the search and rescue mission. Consequently, an unpowered RFID transponder can be located using a narrow, targeted band computational correlation stage instead of conventional reader transmitter.

The computational correlation stage can be used to locate the position of the RFID transponder and identify the transponder's type. The transponder location can be determined by convolving the cross-correlation output with TDOA table of the search area, and the type of transponder can be determined by modulating the signal received from the transponder. The computational correlation stage does not alter the RFID transponder. Instead, it replaces the conventional reader RFID node with dedicated transmitter and correlative receiver.

Figure 6A:
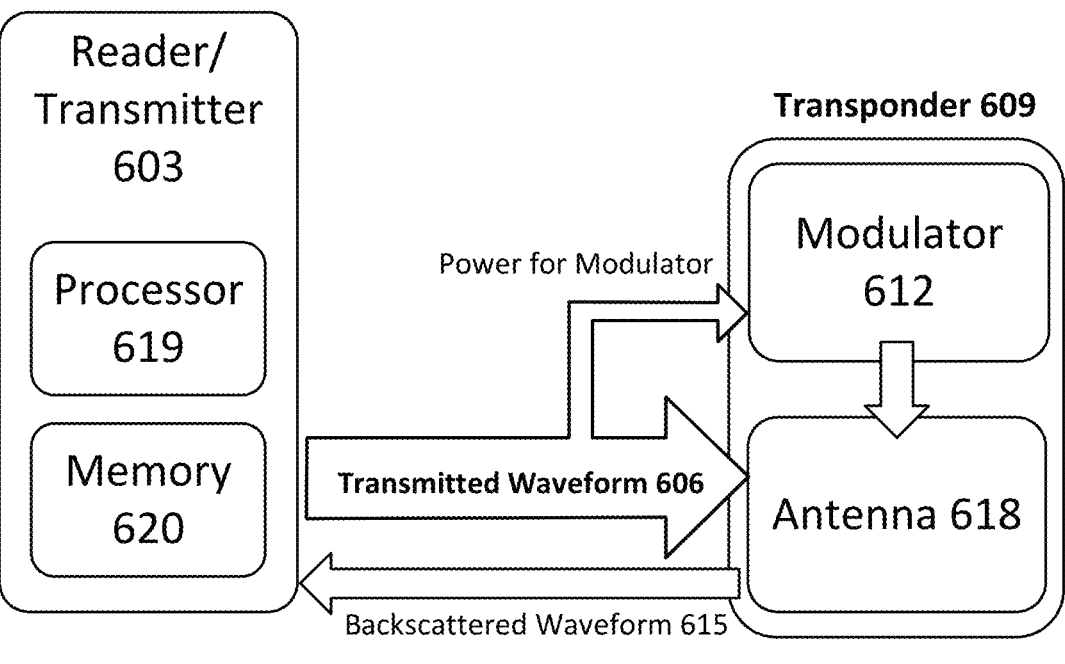
FIG. 6A is a simplified diagram of a radio-frequency identification (RFID) reader and a passive long-range radio frequency identification (LR-RFID) transponder according to at least one embodiment.

FIG. 6A is a simplified diagram of a radio-frequency identification (RFID) reader and a passive long range radio frequency identification (LR-RFID) transponder according to at least one embodiment. The RFID reader 603 generates a signal 606 (e.g., a transmitted waveform) that is received at transponder 609. The signal 606 received at transponder 609 can power the modulator 612 which can add the payload (e.g., identifier) to the return signal 615. Additionally, the signal 606 can power the antenna 618, which can transmit the return signal 615, with the payload, to the RFID reader 603.

The operations described with reference to FIG. 6A can be performed in response to software code executing on the processor 619. Processor 619 can be one or more processors in some embodiments. The software code may be stored as a series of instructions or commands on memory 620 for storage and/or transmission. A suitable memory can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The memory may be any combination of such devices.

Figure 6B:
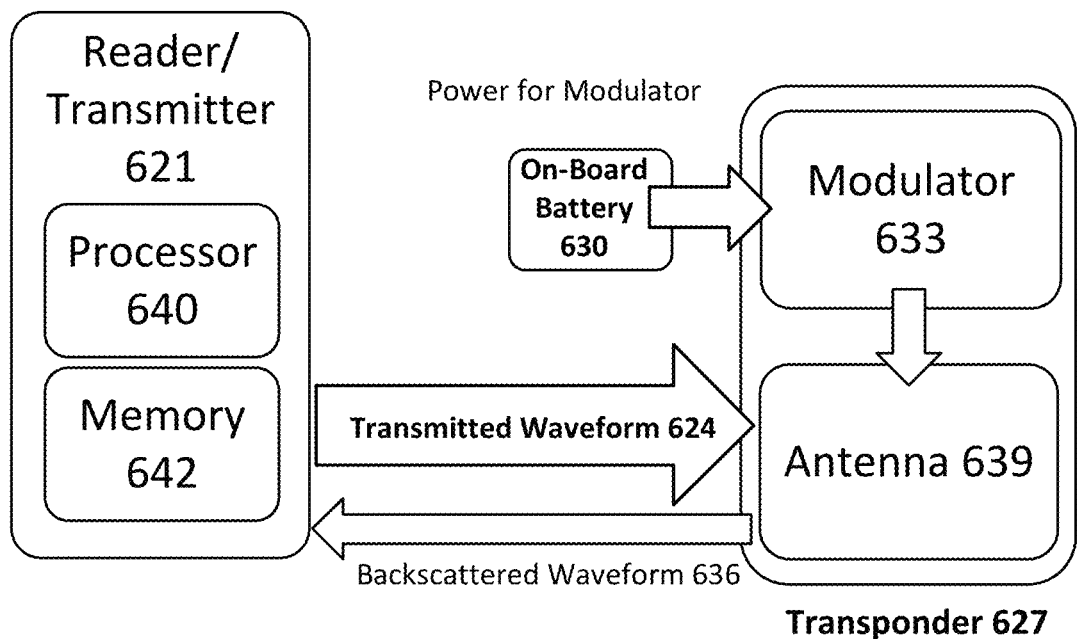
FIG. 6B is a simplified diagram of a radio-frequency identification (RFID) reader and an active long-range radio frequency identification (LR-RFID) transponder according to at least one embodiment.

FIG. 6B is a simplified diagram of a radio-frequency identification (RFID) reader and an active long range radio frequency identification (LR-RFID) transponder according to at least one embodiment. The RFID reader 621 generates a signal 624 (e.g., a transmitted waveform) that is received at transponder 627. The signal 624 received at the transponder 627 can trigger an on-board battery 630 that powers the modulator 633, which can add the payload (e.g., identifier) to the return signal 636. The signal 624 can also power the antenna 639, which can transmit the return signal 636, with the payload, to the RFID reader 621.

The operations described with reference to FIG. 6B can be performed in response to software code executing on the processor 640. Processor 640 can be one or more processors in some embodiments. The software code may be stored as a series of instructions or commands on memory 642 for storage and/or transmission. A suitable memory can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The memory may be any combination of such devices.

Figure 7:
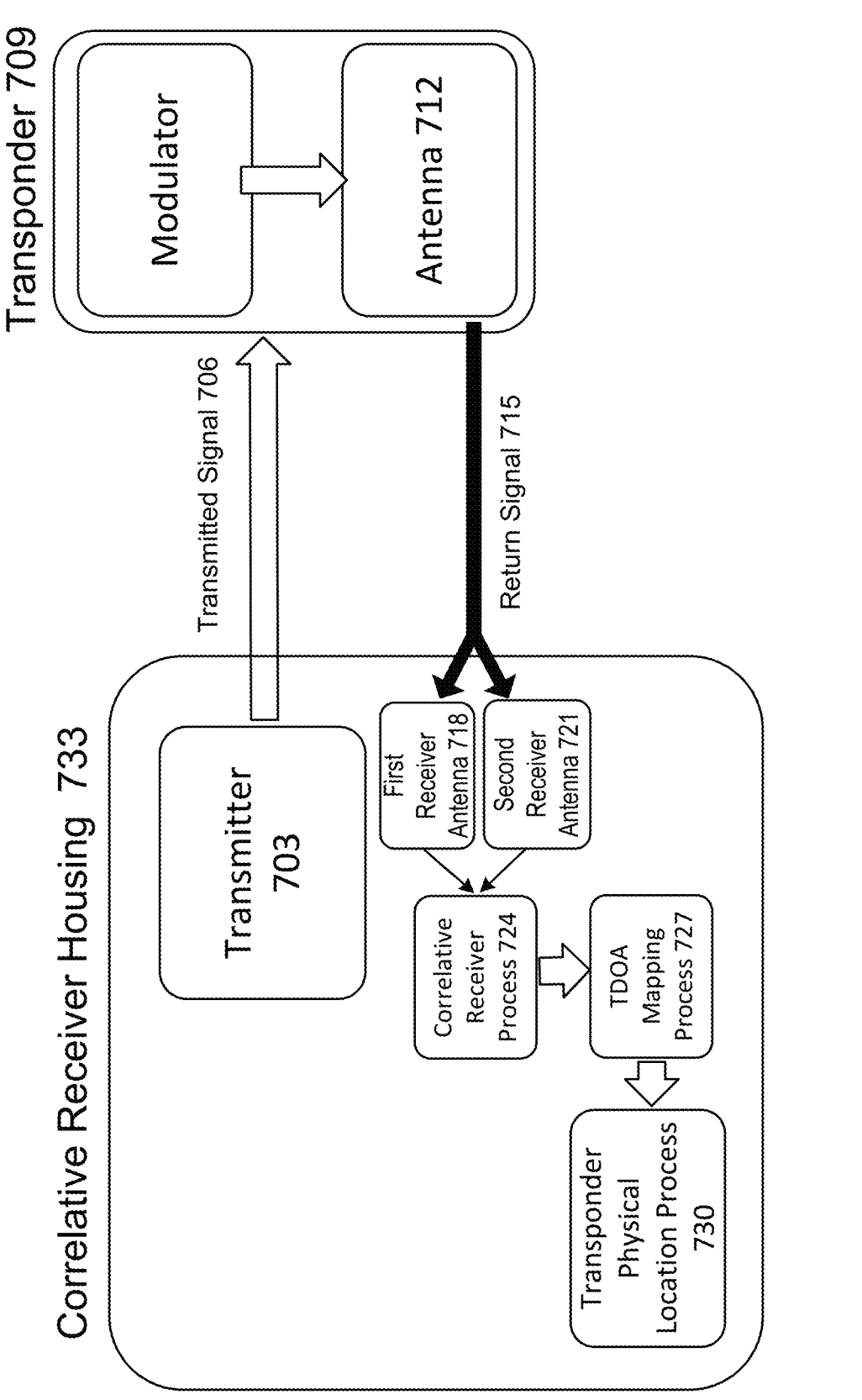
FIG. 7 is a simplified diagram of a correlative receiver according to at least one embodiment.

FIG. 7 is a simplified diagram of a correlative receiver according to at least one embodiment. Transmitter 703 is intended to generate transmitted signal 706 with enough radio frequency (RF) energy to activate the transponder 709 (e.g., a RFID transponder). To accomplish this goal, the transmitter can modulate a strong RF emission in time and/or frequency, targeting specific bands (e.g., frequency bands defined by a standard) and using standard protocols. As an example, frequency bands centered at 6.78 MHz, 13.56 MHz, 27.125 MHz, 40.68 MHz, 433.92 MHz, 2.45 GHz, 5.8 GHz and 24.125 GHz are all regulated and recognized as operating RFID frequencies. In addition, standardized modulation schemes such as amplitude shift keying (ASK), frequency shift keying (FSK), phase shift keying (PSK) and subcarrier modulation can be used. The transmitter can operate over a subset of these bands and a subset of modulation formats or incorporate all of these bands and/or modulation formats in order to find any RFID in a designated search area.

The antenna 712 in transponder 709 can use the RF energy from the transmitted signal 706 to generate a return signal 715. The first receiver antenna 718 and the second receiver antenna 721 can receive the return signal 715 at different times because of the differing distances between the first receiver antenna 718 and the transponder 709 and the second receiver antenna 721 and the transponder 709. For example, the first receiver antenna 718 and the second receiver antenna 721 may be separated by 2 cm, 15 cm, 30 cm, 60 cm, 1 m, 1.5 m, 3 m, 7.5 m, 10 m, 20 m, 30 m, or the like. The signals received at the first receiver antenna 718 and the second receiver antenna 721 can be used to calculate TDOA or FDOA values as discussed above. The first receiver antenna 718 and the second receiver antenna 721 may extract the payload from return signal 715 before the received signals are correlated. Using the extracted payload, not only the location of the transponder, but identity information corresponding to the transponder can be determined.

The correlative receiver process 724 can use equation (2) to calculate the magnitude of the correlation between the TDOA or the FDOA for multiple copies of the return signal 715. The correlative receiver process 724 can generate a TDOA-FDOA map for each calculated correlation. The TDOA mapping process 727 can use the precomputed TDOA map and a TDOA-FDOA maps generated by the correlative receiver process 724 to create a correlation map (e.g., as illustrated in FIGS. 4C-4D). The TDOA mapping process can combine multiple correlation maps to create an average map. The transponder physical location process 730 can locate the transponder's location on a coordinate plane by identifying the maximum correlation magnitude on correlation maps, or the average map, generated by TDOA mapping process 727.

The transmitter 703, first receiver antenna 718, second receiver antenna 721, correlative receiver process 724, TDOA mapping process 727, and transponder physical location process 730 can be contained in a correlative receiver housing 733. The transmitter 703, as part of the correlative receiver housing 733, can generate the transmitted signal 706 at locations that vary between correlation maps. In some embodiments, the transmitter 703, first receiver antenna 718, and second receiver antenna 721 may not be contained within a single housing (e.g., correlative receiver housing 733) or part of a single device. In such embodiments, the transmitter 703 may remain stationary while the first receiver antenna and the second receiver antenna are moved to different locations when generating transmitted signal 706, thereby creating multiple correlation maps. In these embodiments, at least one of the first receiver antenna 718 or second receiver antenna 721 may change locations between transmitted signals to create a diversity of correlation maps.

Figure 8:
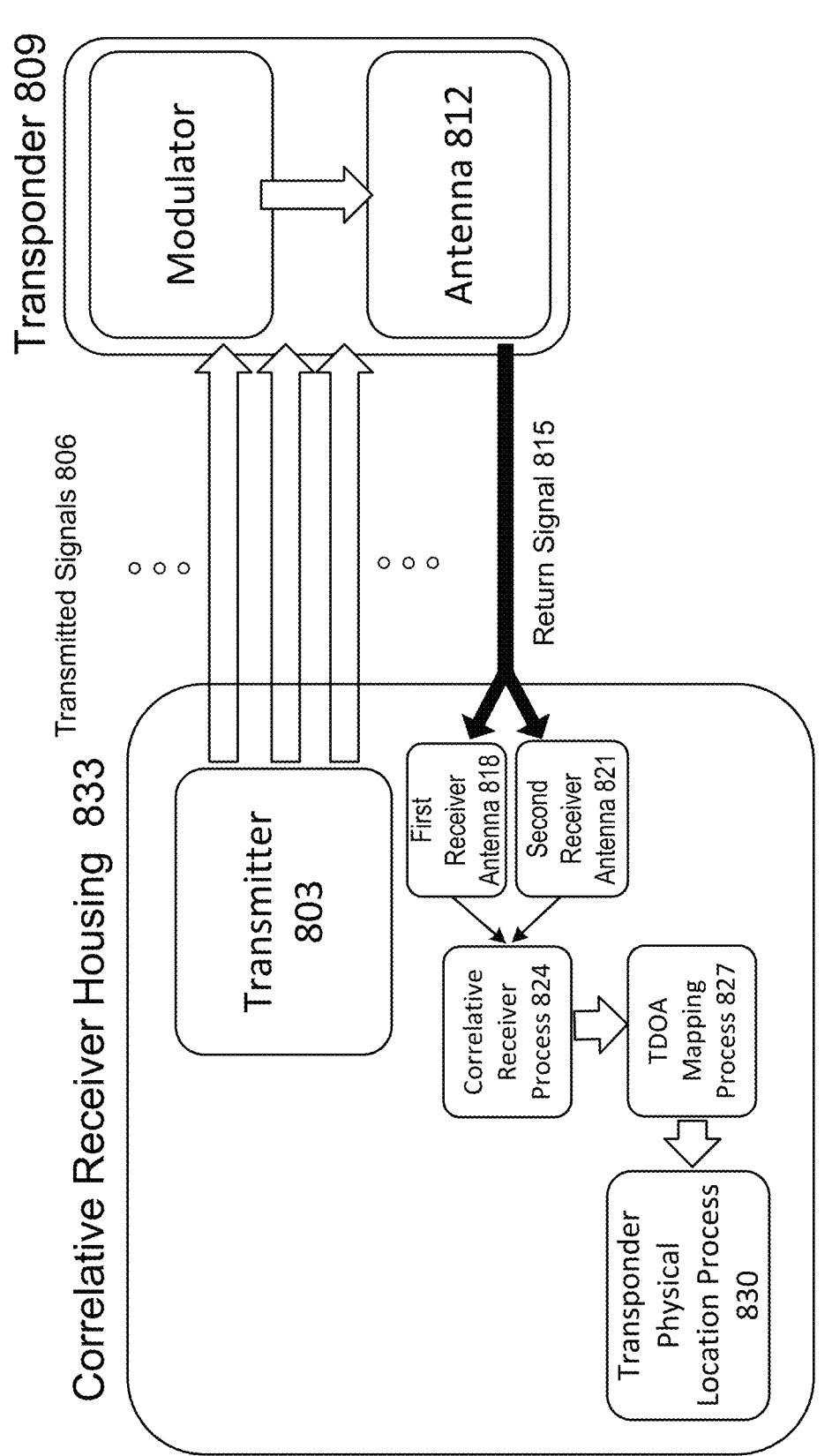
FIG. 8 is a simplified diagram of a correlative receiver with a transmitter operating with a diversity of transmitted waveforms according to at least one embodiment.

FIG. 8 is a simplified diagram of a correlative receiver with a transmitter operating with a diversity of transmitted waveforms according to at least one embodiment. The correlative receiver and other components illustrated in FIG. 8 shares common elements with the correlative receiver and other components illustrated in FIG. 7 and the description provided in relation to FIG. 7 is applicable to FIG. 8 as appropriate. The transmitted signals 806 generated by transmitter 803 can include multiple waveforms with a diversity of frequency bands and modulation formats. In addition, transmitter 803 can spatially steer the transmitted signals 806 to direct the waveform (e.g., a spatially steered waveform) in a specific direction or to a specific location in the search area. The transmitter 803 can utilize a rotating antenna that can steer the transmitted signals 806 in multiple directions. In addition, the transmitter 803 can utilize multiple antennas configured to steer the transmitted signals 806 to specific spatial locations or specific directions.

Transmitter 803 is intended to generate transmitted signals 806 with enough radio frequency (RF) energy to activate the transponder 809 (e.g., a RFID transponder). To accomplish this goal, the transmitter can modulate a strong RF emission in time and/or frequency, to transmit waveforms targeting specific bands (e.g., frequency bands defined by a standard) and using standard protocols. As an example, frequency bands centered at 6.78 MHz, 13.56 MHz, 27.125 MHz, 40.68 MHz, 433.92 MHz, 2.45 GHz, 5.8 GHz and 24.125 GHz are all regulated and recognized as operating RFID frequencies. In addition, standardized modulation schemes such as amplitude shift keying (ASK), frequency shift keying (FSK), phase shift keying (PSK) and subcarrier modulation can be used. As an example, transmitter 803 can generate transmitted signals 806 including a waveform modulated using amplitude shift keying (ASK) with a frequency band centered at 6.78 MHz and a frequency shift keying modulated waveform with a frequency band centered on 5.8 GHz. The transmitter can operate over a subset of these bands and a subset of modulation formats or incorporate all of these bands and/or modulation formats in order to find any RFID in a designated search area.

The antenna 812 in transponder 809 can use the RF energy from the transmitted signal 806 to generate a return signals 815. The first receiver antenna 818 and the second receiver antenna 821 can receive the return signals 815 at different times because of the differing distances between the first receiver antenna 818 and the transponder 809 and the second receiver antenna 821 and the transponder 809. For example, the first receiver antenna 818 and the second receiver antenna 821 may be separated by 2 cm, 15 cm, 30 cm, 60 cm, 1 m, 1.5 m, 3 m, 7.5 m, 10 m, 20 m, 30 m, or the like. The signals received at the first receiver antenna 818 and the second receiver antenna 821 can be used to calculate TDOA or FDOA values as discussed above. The first receiver antenna 818 and the second receiver antenna 821 may extract the payload from one of the return signals 815 before the received signals are correlated.

The correlative receiver process 824 can use equation (2) to calculate the magnitude of the correlation between the TDOA or the FDOA for multiple copies of the return signals

815. The correlative receiver process 824 can generate a TDOA-FDOA map for each calculated correlation. The TDOA mapping process 827 can use the precomputed TDOA map and a TDOA-FDOA maps generated by the correlative receiver process 824 to create a correlation map (e.g., as illustrated in FIGS. 4C-4D). The TDOA mapping process can combine multiple correlation maps to create an average map. The transponder physical location process 830 can locate the transponder's location on a coordinate plane by identifying the maximum correlation magnitude on correlation maps, or the average map, generated by TDOA mapping process 827.

The transmitter 803, first receiver antenna 818, second receiver antenna 821, correlative receiver process 824, TDOA mapping process 827, and transponder physical location process 830 can be contained in a correlative receiver housing 833. The transmitter 803, as part of the correlative receiver housing 833, can generate the transmitted signals 806 at locations that vary between correlation maps. In some embodiments, the transmitter 803, first receiver antenna 818, and second receiver antenna 821 may not be contained within a single housing (e.g., correlative receiver housing 833) or part of a single device. In such embodiments, the transmitter 803 may remain stationary while the first receiver antenna and the second receiver antenna are moved to different locations when generating transmitted signals 806 that are used to create multiple correlation maps. In these embodiments, at least one of the first receiver antenna 818 or second receiver antenna 821 may change locations between transmitted signals to create a diversity of correlation maps.

Figure 9:
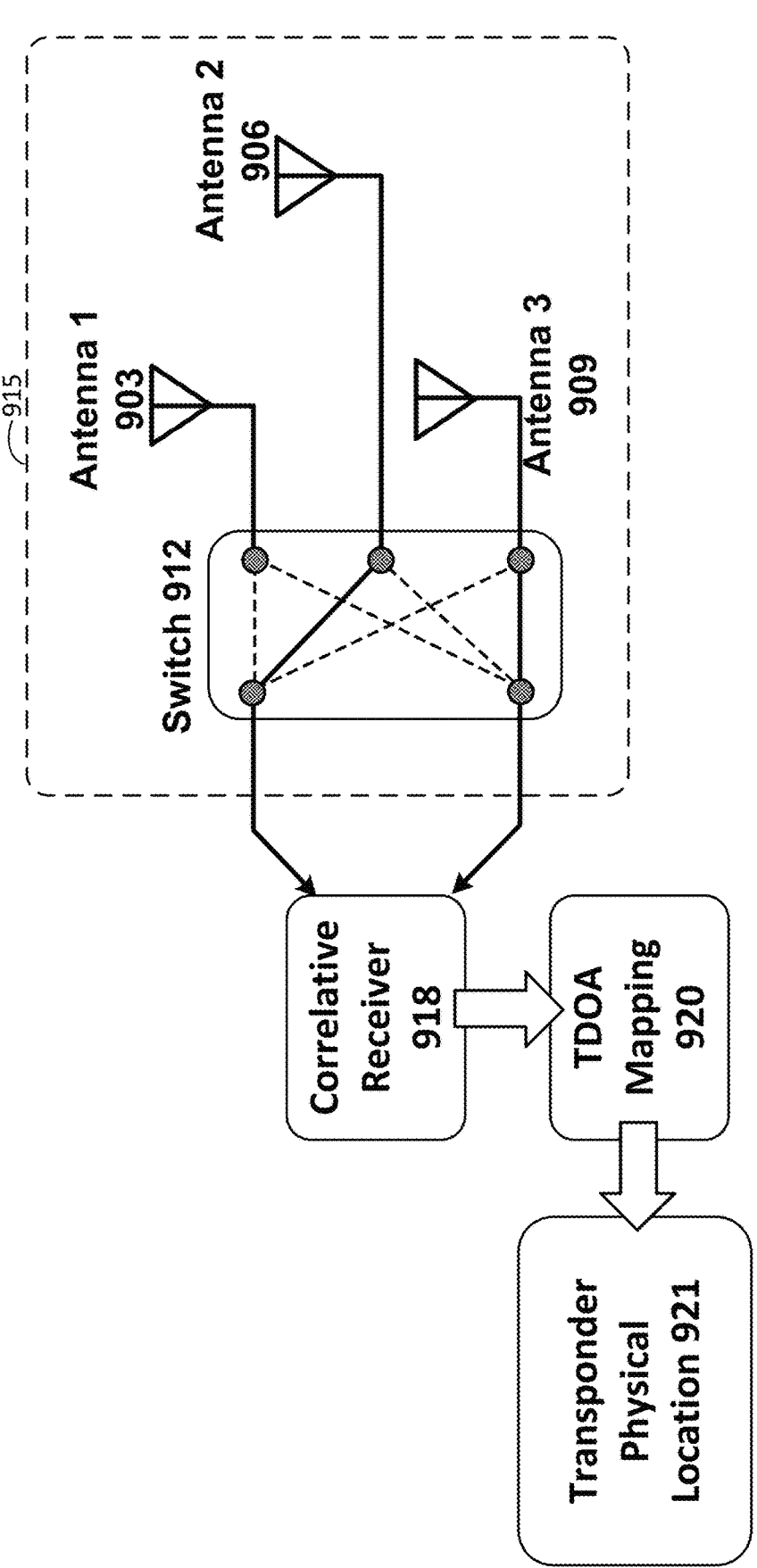
FIG. 9 is a simplified diagram of a correlative receiver with switched antennas according to at least one embodiment.

FIG. 9 is a simplified diagram of a correlative receiver with switched antennas according to at least one embodiment. The correlative receiver and other components illustrated in FIG. 9 shares common elements with the correlative receiver and other components illustrated in FIGS. 7 and 8 and the description provided in relation to FIGS. 7 and 8 is applicable to FIG. 9 as appropriate. Referring to FIG. 9, correlative receiver process 918 is electrically coupled to switch 912. A first antenna 903, a second antenna 906, and a third antenna 909 are also electrically coupled to switch 912. Signals received by and output signals produced by correlative receiver process 918 are transmitted to TDOA mapping process 920 and transponder physical location process 921 as discussed in relation to FIGS. 7 and 8.

During the operation of the correlative receiver, the return signal can be received at the antenna 1 903, antenna 2 906, or antenna 3 909. While three antennas are depicted, other configurations with more antennas are included within the scope of the present invention. Antenna array 915 can comprise antenna 1 903, antenna 2 906, antenna 3 909, and switch 912. Switch 912 can connect any two of antenna 1 903, antenna 2 906, or antenna 3 909 in the antenna array 915 to the correlative receiver process 918.

Thus, switching between the antenna 1 903, antenna 2 906, or antenna 3 909 can be used to generate diversity of signal delays because the distance between the antennas connected to correlative receiver process 918 by switch 912 will vary based on the configuration of the connected antennas in antenna array 915. The different configurations of antennas can be used provide directional information to the correlative receiver. While the correlative receiver can be a two-port device, it can be driven by switching between antenna configurations. By switching the antennas in pairs, correlative receiver process 918 can acquire at least three sets of independent correlative measurements without moving the receiver. For example, FIG. 9 shows switch 912 connecting antenna 2 906 and antenna 3 909 to correlative receiver process 918 with a first distance between antenna 2 906 and antenna 3 909. A signal received at antenna 2 906 and antenna 3 903 can be used by correlative receiver process 918 to calculate a first set of TDOA and FDOA values. The configuration of antenna array 915 can change, without moving the correlative receiver, and antenna 1 903 and antenna 3 909 can be connected to correlative receiver process 918 by switch 912. Antenna 1 903 and antenna 3 909 can be separated by a second distance. Correlative receiver process 918 can use a second signal received at antenna 1 903 and antenna 3 909 to calculate a second set of TDOA and FDOA values. In at least one embodiment, a pair of antennas can rotate at rate that is slower than the correlative receiver integration time, effectively offering multiple directivity feeds during the rotation period.

FIG. 10 is a flowchart of a method 1000 for performing device localization in accordance with at least one embodiment of the present disclosure. Referring to FIG. 10, the method includes dividing a search area into a grid of points (1010). The search area may be an area around a correlative receiver (e.g., a 300-meter circle around the receiver), or the search area may be a geographic area such as downtown Portland Oregon, Glacier National Park, SoFi Stadium, etc.

The grid of points could be a two-dimensional grid such as a Cartesian plane or a three-dimensional grid of points. The search area can be divided into a grid of points by subdividing the search area at regular intervals. For example, the points in the grid of points can be equally spaced or the spacing between points can vary based on each point's distance to the correlative receiver. For example, the points in the grid of points can be spaced further apart as the distance from the correlative receiver increases.

The method also includes calculating a projected time difference of arrival (TDOA) value and a projected frequency difference of arrival (FDOA) value for at least a subset of points of the grid of points (1020). Projected time difference of arrival (TDOA) and frequency difference of arrival (FDOA) values can be calculated for at least a subset of the points of the grid of points. The projected TDOA values for a point can be the expected TDOA values if a signal was generated at the point. The projected FDOA values for a point can be the expected FDOA values if a signal was generated at the point.

The method also includes generating a set of correlation maps by, for each correlation map emitting a signal from transmitter positioned at a location that varies between each correlation map (1030). A signal can be emitted from a transmitter for each map. The transmitter's position can vary between each map. The signal can be transmitted signal 706 or transmitted signals 806. The signal can be a single waveform or multiple waveforms with varied frequency bands and/or modulation formats. The transmitter can be transmitter 703 or transmitter 803. The signal can be generated by first receiver antenna 718, second receiver antenna 721, first receiver antenna 818, or second receiver antenna 821 or antenna 1 903, antenna 2 906, or antenna 3 909 in various embodiments. The transmitter's location may vary between each correlation map if the transmitter generating the transmitted signal and the antennas receiving the first return signal and the second return signal are part of the same device or contained within the same housing (e.g., correlative receiver housing 733 or correlative receiver housing 833) as the transmitter. In some embodiments, at least one of first antenna or the second antenna may change locations for each correlation map while the transmitter remains stationary.

The method also includes receiving, at a time, a first return signal at a first antenna and a second return signal at a second antenna, first return signal and the second return signal generated by a radio-frequency identification (RFID) antenna (1040). The first return signal or the second return signal can be received at a time and the time may exceed a minimum time threshold. The minimum time threshold can be 1 microsecond ($\mu$s), 10 $\mu$s, 50 $\mu$s, 100 $\mu$s, 250 $\mu$s, 500 $\mu$s, or 1000 $\mu$s. The minimum time threshold can be controlled by controlling the transmission time for the signal emitted at operation 1030.

The return signals can be generated by an RFID antenna such as antenna 712, or antenna 812 and the return signals can be return signal 715, or return signals 815. The return signals can have a frequency in the ultra-high frequency band (UHF; 868-915 MHz) or microwave band (2.5 GHz and 5.8 GHz). The return signal's bandwidth can exceed a minimum bandwidth threshold (e.g., 1 hertz (Hz), 5 Hz, 10 Hz, 20 Hz, 50 Hz, 100 Hz, 250 Hz, or 500 Hz). The first antenna or the second antenna can be one of first receiver antenna 718, second receiver antenna 721, first receiver antenna 818, or second receiver antenna 821 or antenna 1 903, antenna 2 906, or antenna 3 909 in various embodiments. The first antenna, the second antenna, and a third antenna can be part of an antenna array such as antenna array 915. The location of the correlative receiver can be varied by receiving the return signal at one of the first antenna or the second antenna and a third antenna of the antenna array. The first antenna, the second antenna, or the third antenna can be any one of antenna 1 903, antenna 2 906, or antenna 3 909. The payload (e.g., a unique identifier, a serial number, an alphanumeric code, etc.) may be read from the first return signal or the second return signal.

The method also includes determining at least one of a set of observed time difference of arrival values or a set of observed frequency difference of arrival values for the first return signal and the second return signal (1050). The TDOA can be the difference between the time when the first signal is received at the first antenna and the time when the second signal is received at the second antenna. The FDOA can be the difference between the frequency of the first signal received at the first antenna and the frequency of the second signal received at the second antenna. The observed TDOA or FDOA can be calculated by the correlative receiver process 724, correlative receiver process 824, or correlative receiver process 918. The correlative receiver process can calculate the TDOA or FDOA using a processor executing code or hardware, such as a field-programmable gate array, in various implementations. In some embodiments, a set of observed time difference of arrival is determined. In some embodiments, a set of observed frequency difference of arrival values is determined. In some embodiments, both a set of observed time difference of arrival values and a set of observed frequency difference of arrival values are determined.

The method also includes determining a set of correlation values by providing at least one of the set of observed time difference of arrival values or the set of observed frequency difference of arrival values as input to a cross ambiguity function (CAF) generator (1060). The correlation values can be calculated by correlative receiver process 724, correlative receiver process 824, or correlative receiver process 918. The correlative receiver process can calculate the correlation values using a processor executing code or hardware, such as a field-programmable gate array, in various implementations. The correlation values can be calculated using equation (2). In some embodiments, the set of observed time difference of arrival is provided. In some embodiments, the set of observed frequency difference of arrival values is provided. In some embodiments, both the set of observed time difference of arrival values and the set of observed frequency difference of arrival values are provided.

The method also includes generating the correlation map by plotting the set of correlation values onto the search area by assigning a correlation value corresponding to a pair, comprising at least one of an observed time difference of arrival value or a frequency difference of arrival value, to a point on the grid that corresponds to at least one of a projected time difference of arrival or a projected frequency difference of arrival value that are within a threshold difference of the pair (1070). The correlation values can be plotted by assigning a correlation value to a point on the grid that corresponds to at least one of a projected TDOA or a projected FDOA value that are within a threshold difference of at least one of the observed TDOA or the FDOA values used to generate the correlation values (e.g., a pair). In some embodiments, the correlation value can be assigned to a point on the grid that corresponds to both the observed TDOA or the FDOA values used to generate the correlation values. A correlation map can be made for each signal generated at operation 1030 to create a set of correlation maps. The correlation map can be generated by TDOA mapping process 727, or TDOA mapping process 827. The TDOA mapping process can generate a map using a processor executing code or hardware, such as a field-programmable gate array, in various implementations.

The method also includes averaging the set of correlation maps to produce an average map (1080). The set of correlation maps can be averaged by finding the mean value for the correlation values for each point of the grid of points. The set of correlation maps can be averaged by TDOA mapping process 727, or TDOA mapping process 827. The TDOA mapping process 727 or TDOA mapping process 827 can average the set of correlation maps using a processor executing code or hardware, such as a field-programmable gate array, in various implementations.

The method also includes locating the radio-frequency identification antenna on the average map by identifying a maximum correlation value (1090). The RFID antenna can be located by determining the highest correlation value on the average map. The TDOA mapping process 727, or TDOA mapping process 827 can determine the highest correlation value and locate the RFID antenna. The TDOA mapping process can determine the highest correlation value using a processor executing code or hardware, such as a field-programmable gate array, in various implementations.

It should be appreciated that the specific steps illustrated in FIG. 10 provide a particular method of performing device localization according to an embodiment of the present disclosure. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
dividing a search area into a grid of points;
calculating a projected time difference of arrival (TDOA) value and a projected frequency difference of arrival (FDOA) value for at least a subset of points of the grid of points;
generating a set of correlation maps by, for each correlation map:
emitting a signal from a transmitter positioned at a location that varies between each correlation map;
receiving, at a time, a first return signal at a first antenna and a second return signal at a second antenna, the first return signal and the second return signal generated by a radio-frequency identification (RFID) antenna;
determining at least one of a set of observed time difference of arrival values or a set of observed frequency difference of arrival values for the first return signal and the second return signal;
determining a set of correlation values by providing the at least one of the set of observed time difference of arrival values or the set of observed frequency difference of arrival values as input to a cross ambiguity function (CAF) generator; and
generating the correlation map by plotting the set of correlation values onto the search area by assigning a correlation value corresponding to at least one of an observed time difference of arrival value or an observed frequency difference of arrival value, to a point on the grid of points that corresponds to at least one of a projected time difference of arrival or a projected frequency difference of arrival value that are within a threshold difference;
averaging the set of correlation maps to produce an average map; and
locating the RFID antenna on the average map by identifying a maximum correlation value.

2. The method of claim 1, wherein a bandwidth of the signal exceeds a minimum bandwidth threshold.

3. The method of claim 1, wherein the time exceeds a minimum time threshold.

4. The method of claim 1, further comprising reading a payload from the first return signal or the second return signal.

5. The method of claim 1, wherein the signal is emitted by the first antenna.

6. The method of claim 1, wherein the signal comprises a plurality of signals at different frequency bands.

7. The method of claim 1, further comprising steering the signal using the transmitter, wherein the transmitter comprises one or more antennas configured to spatially steer the signal.

8. The method of claim 1, further comprises receiving the first return signal and the second return signal at an antenna array comprising the first antenna, the second antenna, and a third antenna.

9. An apparatus for locating a radio-frequency identifier antenna using a cross ambiguity function (CAF), the apparatus comprising:
   a transmitter configured to emit a signal;
   a first antenna configured to receive a first return signal;
   a second antenna configured to receive a second return signal;
   a memory; and
   a processor coupled to the memory, wherein the processor is configured to perform operations including:
   dividing a search area into a grid of points;
   calculating a projected time difference of arrival (TDOA) value and a projected frequency difference of arrival (FDOA) value for at least a subset of the points of the grid of points;
   generating a set of correlation maps by, for each correlation map:
     emitting the signal from the transmitter positioned at a location that varies between each correlation map;
     receiving, at a time, the first return signal at the first antenna and the second return signal at the second antenna, the first return signal and the second return signal generated by a radio-frequency identification (RFID) antenna;
     determining at least one of a set of observed time difference of arrival values or a set of observed frequency difference of arrival values for the first return signal and the second return signal;
     determining a set of correlation values by providing the at least one of the set of observed time difference of arrival values or the set of observed frequency difference of arrival values as input to a cross ambiguity function (CAF) generator; and
     generating the correlation map by plotting the set of correlation values onto the search area by assigning a correlation value corresponding at least one of an observed time difference of arrival value or an observed frequency difference of arrival value, to a point on the grid of points that corresponds to at least one of a projected time difference of arrival or a projected frequency difference of arrival value that are within a threshold difference;
   averaging the set of correlation maps to produce an average map; and
   locating the radio-frequency identification antenna on the average map by identifying a maximum correlation value.

10. The apparatus of claim 9, wherein a bandwidth of the signal exceeds a minimum bandwidth threshold.

11. The apparatus of claim 9, wherein the time exceeds a minimum time threshold.

12. The apparatus of claim 9, further comprising reading a payload from the first return signal or the second return signal.

13. The apparatus of claim 9, wherein the signal is emitted by the first antenna.

14. The apparatus of claim 9, wherein the signal comprises a plurality of signals at different frequency bands.

15. The apparatus of claim 9, further comprising:
   steering the signal using the transmitter, the transmitter comprising one or more antennas configured to spatially steer the signal.

16. The apparatus of claim 9, further comprising receiving the first return signal and the second return signal at an antenna array comprising the first antenna, the second antenna, and a third antenna.

17. A computer-implemented method comprising:
   dividing a search area into a grid of points;
   calculating a projected time difference of arrival (TDOA) value and a projected frequency difference of arrival (FDOA) value for at least a subset of points of the grid of points;
   generating a set of correlation maps by, for each correlation map:
     emitting a signal from a transmitter positioned at a location that varies between each correlation map;
     receiving, at a time, a first return signal at a first antenna and a second return signal at a second antenna, the first return signal and the second return signal generated by a radio-frequency identification (RFID) antenna;
     determining a set of observed time difference of arrival values and a set of observed frequency difference of arrival values for the first return signal and the second return signal;
     determining a set of correlation values by providing the set of observed time difference of arrival values and the set of observed frequency difference of arrival values as input to a cross ambiguity function (CAF) generator; and
     generating the correlation map by plotting the set of correlation values onto the search area by assigning a correlation value corresponding to an observed time difference of arrival value and an observed frequency difference of arrival value to a point on the grid of points that corresponds to a projected time difference of arrival and a projected frequency difference of arrival value that are within a threshold difference;
   averaging the set of correlation maps to produce an average map; and
   locating the RFID antenna on the average map by identifying a maximum correlation value.

18. The method of claim 17, further comprising reading a payload from the first return signal or the second return signal.

19. The method of claim 17, wherein the signal comprises a plurality of signals at different frequency bands.

20. The method of claim 17, further comprising steering the signal using the transmitter, wherein the transmitter comprises one or more antennas configured to spatially steer the signal.

* * * * *